United States Patent [19]

Hammer

[11] Patent Number: 4,773,720
[45] Date of Patent: Sep. 27, 1988

[54] OPTICAL WAVEGUIDE

[75] Inventor: Jacob M. Hammer, Princeton Borough, N.J.

[73] Assignee: General Electric Company, Schenectady, N.Y.

[21] Appl. No.: 869,913

[22] Filed: Jun. 3, 1986

[51] Int. Cl.⁴ .............................................. G02B 6/10
[52] U.S. Cl. ................................................ 350/96.12
[58] Field of Search ................ 350/96.12, 96.13, 96.14

[56] References Cited

U.S. PATENT DOCUMENTS

| | | | |
|---|---|---|---|
| 3,833,284 | 9/1974 | Kaminow et al. | 350/96.12 X |
| 3,980,392 | 9/1976 | Auracher | 350/96.14 |
| 4,372,641 | 2/1983 | Johnson et al. | 350/96.12 |
| 4,606,602 | 8/1986 | Unger et al. | 350/96.15 X |

FOREIGN PATENT DOCUMENTS

| | | | |
|---|---|---|---|
| 26240 | 2/1977 | Japan | 350/96.12 |
| 67344 | 6/1977 | Japan | 350/96.12 |
| 12907 | 1/1980 | Japan | 350/96.12 |

Primary Examiner—William L. Sikes
Assistant Examiner—Akm E. Ullah
Attorney, Agent, or Firm—Harley R. Ball; James C. Davis, Jr.; Paul R. Webb, II

[57] ABSTRACT

A waveguide includes a substrate having a major surface and a waveguide layer on the surface of the substrate. At least one confinement layer is on the waveguide layer and includes a transition region. The transition region is an extension of the confinement layer which tapers in width from the width of the confinement layer to a point. The waveguide layer may include a second confinement layer on the waveguide layer which is of a width different from the width of the first confinement layer and has an extension which extends along and contacts both sides of the tapered extension of the one confinement layer. Alternatively, the other confinement layer may extend along both sides of the waveguide layer. The waveguide serves to change the cross-sectional geometry of a beam of light passing along the waveguide layer.

11 Claims, 2 Drawing Sheets

OPTICAL WAVEGUIDE

The Government has rights in this invention pursuant to a Government contract.

The present invention relates to an optical waveguide, and more particularly, to an optical waveguide having a transition region for coupling waveguides of different dimensional geometries.

BACKGROUND OF THE INVENTION

With the increased interest in optical communications, it has been found desirable to form optical circuits in which light is transferred from one type of element to another, such as from a semiconductor injection laser as a source of the light to a light detector of some kind. The optical circuit may be entirely through a waveguide in a substrate or may be partially through the air. However, in such circuits it is frequently desirable to have the light pass between waveguides of different cross-sectional geometries. For example, it may be necessary to transfer the asymmetrical output of an injection laser to a stripe optical waveguide, and then transfer the light to a waveguide having equal lateral and transverse mode size to provide a symmetric output beam. In another application it may be desirable to couple light from a waveguide formed of many layers to one in which the light travels through fewer layers. Various methods have been tried to achieve these transfers of the light which have included designing specific geometries and choosing specific materials for the waveguides to achieve a phased match between the two waveguides being coupled. However, such systems are difficult to design since the choice of materials and geometries is severely limited and the length of the coupled region must be precisely controlled. Another technique has been to use a coupling region which is tapered in thickness. However, this is also difficult to make.

SUMMARY OF THE INVENTION

A waveguide including a substrate having a major surface and a waveguide layer of a material having a refractive index $n_1$ on the major surface. At least one confinement layer of a material having a refractive index $n_1$ is on the major surface of the substrate. A transition region is on the waveguide layer. The transition region is an extension of the one confinement layer which tapers only in width from the width of the one confinement layer to a point.

DETAILED DESCRIPTION OF PREFERRED EMBODIMENTS

Figure 1:
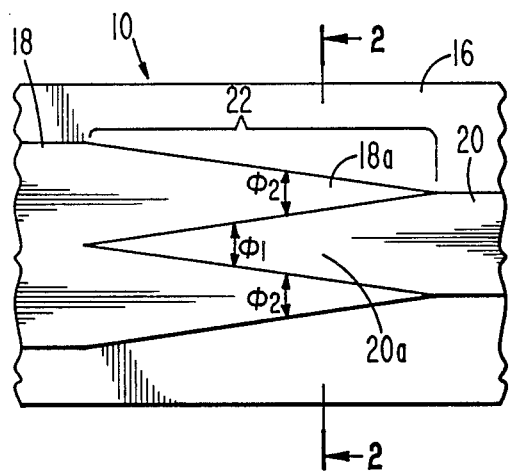
FIG. 1 is a top plan view of one form of the waveguide of the present invention.
Figure 2:
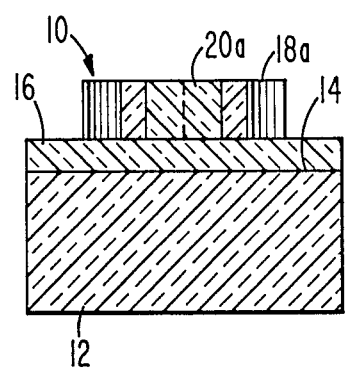
FIG. 2 is a sectional view taken along line 2—2 of FIG. 1.

Referring initially to FIGS. 1 and 2, one form of the waveguide of the present invention is generally designated as 10. The waveguide 10 includes a substrate 12 of a material having a refractive index $n_s$ and a major flat surface 14. On the substrate surface 14 is a waveguide layer 16 of a thickness h and of a material having a refractive index $n_w$ where $n_w$ is preferably greater than $n_s$. On the waveguide layer 16 is a first confinement stripe 18 of a thickness $h_c$, a lateral width $w_{c1}$ and of a material having a refractive index $n_{c1}$. The refractive index $n_{c1}$ is preferably less than the refractive index $n_w$ of the waveguide layer 16. A second confinement stripe 20 is also on the waveguide layer 16 and is in longitudinal alignment with the first confinement stripe 18. The second confinement stripe 20 is also of a thickness $h_c$ but of a lateral width $w_{c2}$ which is different from the lateral width $w_{c1}$ of the first confinement stripe 18. In the form shown the lateral width $w_{c2}$ of the second confinement stripe 20 is less than the lateral width $w_{c1}$ of the first confinement stripe 18. The second confinement stripe 20 is of a material having a refractive index $n_{c2}$ which is preferably less than the refractive index $n_w$ of the waveguide layer 16.

Between the first and second confinement stripes 18 and 20 is a transition region 22. The transition region 22 is formed of extensions 18a and 20a of the first and second confinement stripes 18 and 20 respectively. The extension 20a of the second confinement stripe 20 tapers in width from the width $w_{c2}$ to a point at the adjacent end of the first confinement stripe 18. The extension 18a of the first confinement stripe 18 extends along both sides of the extension 20a and tapers in width from the width $w_{c1}$ of the first confinement stripe 18 to the width $w_{c2}$ of the second confinement stripe 20. Thus, the extensions 18a and 20a contact each other along the side surfaces of the extension 20a. The length of the transition region 22 is not critical. However, it should be chosen so that the apex angles $\theta_1$ and $\theta_2$ are small, preferably less than 5°.

A particular transition for the waveguide 10 of FIGS. 1 and 2 is designed so that a single waveguide mode passing along the waveguide under the first confinement stripe 18 is transferred to a single waveguide mode in the waveguide under the second confinement stripe 20. The waveguide formed under the first confinement stripe 18 may be chosen so that the lateral and transverse mode dimensions are close to those produced by a semiconductor injection diode laser, which is an asymmetrical beam, and the waveguide formed under the second confinement layer 20 is designed so that the lateral mode dimension is equal to the transverse mode dimension, thereby resulting in a symmetric beam. This is highly desirable as a means for converting the normally very asymmetric laser beam to a symmetric output beam. As is well known, the dimensions of a guided mode in a dielectric waveguide are not equal to the physical dimensions of the waveguide. This will be apparent in the following example of a specific waveguide of the form shown in FIGS. 1 and 2.

EXAMPLE I

A waveguide 10 is formed of a substrate 12 of glass having an index of refraction of 1.5, such as BK5 glass made by Jenaer Glaswerk Schott and Gen. of Mainz, West Germany. A waveguide film 16 of aluminum oxide (Al$_2$O$_3$) is evaporated on the surface 14 of the substrate 12 with the aluminum oxide having an index of refraction of approximately 1.56. A first confinement stripe 18 of a glass having an index of refraction of 1.5 and a width of 2.8 μm is on the waveguide layer 16 and a second confinement stripe 20 of a glass having a refractive index of 1.55 and a width of 1.86 μm is on the waveguide layer 16. A glass suitable for the second confinement stripe 20 is a PSK5 glass made by Jenaer Glaswerk Schott and Gen. The waveguide layer 16 is of a thickness of 0.92 μm and the first and second confinement stripes 18 and 20 are of a thickness of at least 1 μm.

The first confinement layer 18 provides a waveguide which will carry a mode having an effective transverse dimension of 1.3 μm and an effective lateral dimension of 3.9 μm for operation at a wavelength of about 0.83 μm. This is a good match to the mode size of a beam of light from a semiconductor injection laser. The second confinement layer 20 provides a waveguide which will carry a mode having both lateral and transverse dimensions of approximately 2.6 μm. Thus, the asymmetrical beam entering the waveguide 10 will be converted to a symmetric beam which can be emitted from the waveguide 10.

The waveguide 10 can be made by first depositing the material of the waveguide layer 16 on the substrate surface 14, such as by evaporation in a vacuum. The material for the second confinement layer 20 can then be deposited on the waveguide layer 16, such as by evaporation or sputtering, and using standard photolithographic techniques and etching the material can be defined to the width and shape of the second confinement layer 20 and its extension 20a. Then while protecting the second confinement layer 20 and its extension 20a, such as with a layer of a photoresist, the material of the first confinement layer 18 is then deposited on the exposed area of the waveguide layer 16. Using standard photolithographic techniques and etching the layer of the material of the first confinement layer 18 can then be defined to the width and shape of the first confinement layer 18 and its extensions 18a. However, if desired, the first confinement layer 18 can be formed first and then the second confinement layer 20. Thus, the waveguide 10 can be formed by standard deposition and photolithographic techniques.

Figure 3:
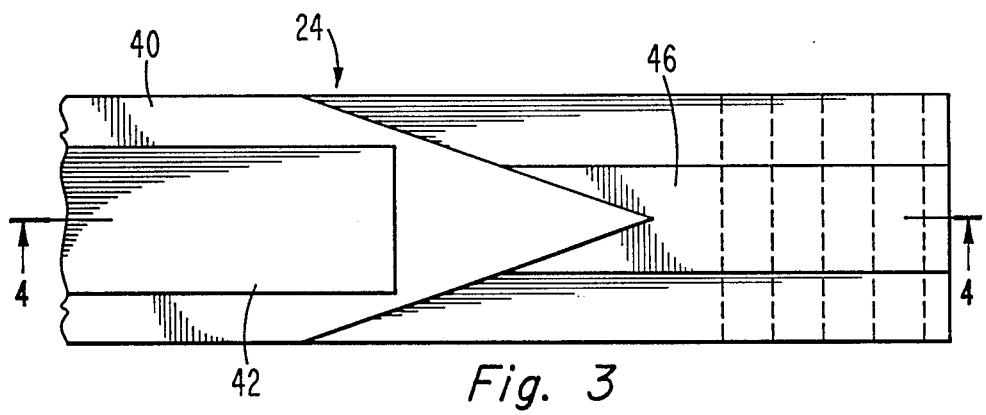
FIG. 3 is a top plan view of an optical device including an injection laser coupled to a waveguide utilizing the present invention.
Figure 4:
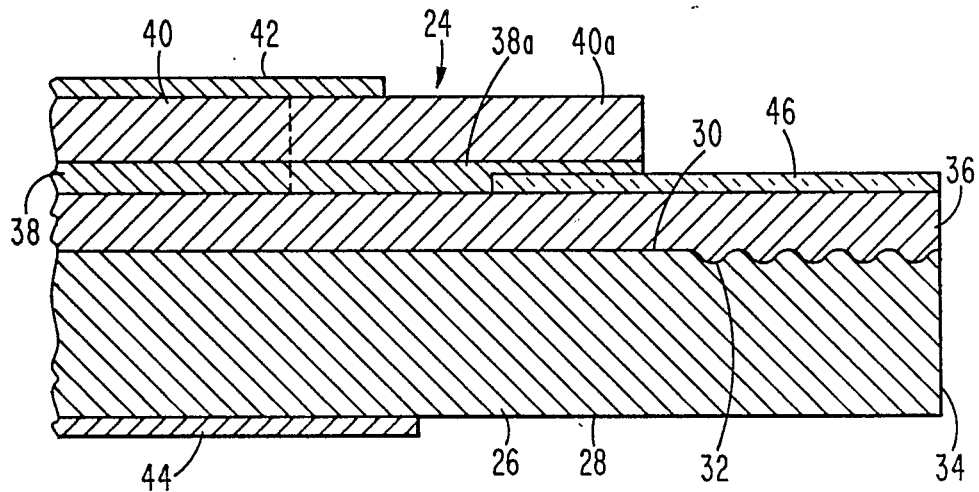
FIG. 4 is a sectional view taken along line 4—4 of FIG. 3.

Referring to FIGS. 3 and 4, another form of a waveguide which incorporates the present invention is a semiconductor injection laser 24. The semiconductor injection laser 24 includes a substrate 26 of a semiconductor material of one conductivity type having a pair of opposed major surfaces 28 and 30. The substrate 26 has a plurality of spaced parallel grooves 32 extending transversely across the major surface 30 at the end surface 34 of the substrate 26. A waveguide layer 36 is on the surface 32 of the substrate 26. The waveguide layer 36 is of a semiconductor material of the same conductivity type as the substrate 26 but having an index of refraction greater than that of the substrate 26. A thin active layer 38 of a semiconductor material of either conductivity type is on the waveguide layer 36 but does not extend over the portion of the waveguide layer 36 which is over the grooves 32. The material of the active layer 38 has an index of refraction greater than that of the waveguide layer 36. A capping layer 40 of a semiconductor material of the conductivity type opposite that of the waveguide layer 36 is on the active layer 38. The capping layer 40 is of a material having an index of refraction less than that of the active layer 38.

As shown in FIG. 3, the active layer 38 and capping layer 40 extend the full width of the substrate 26 and have tapered extensions 38a and 40a which extend along the waveguide layer 36 toward the grooves 32. These extensions serve as the transition region. The tapered extensions 38a and 40a are dimensioned so that the apex angles of the extensions are no greater than 45°. A conductive metal contact 42 is on the capping layer 40 and a portion of the extension 40a. The contract 42 extends longitudinally along the capping layer 40, and, as shown in FIG. 3, is of a width less than the width of the capping layer 40. A second conductive metal contact 44 is on the surface 28 of the substrate 26 and is in direct opposition to the first contact 42. However, the second contact 44 may be of a width equal to the width of the substrate 26.

A confinement stripe 46 is on the waveguide layer and extends longitudinally along the substrate 26 between the end surface 34 and the extension 38a or the active layer 38. The confinement stripe 46 extends along and contacts a portion of the sides of the extension 38a. As shown, the confinement stripe 46 is of a thickness less than the thickness of the active layer 38a and is of a width less than the width of the first contact 42.

The waveguide layer 36, the active layer 38 and the capping layer 40 form a semiconductor injection laser diode which, when properly biased, generates light in the active layer 38. The light travels along the active layer 38 and into the tapered extension 38a. The tapered extensions 38a and 40a transfer the light to the waveguide layer 36 and under the confinement stripe 46. The light is then guided along the waveguide layer under the confinement stripe 46 to the portion of the waveguide layer 36 over the grooves 32. The grooves are of a depth and spacing as to form a distributed Bragg reflector. This reflects at least some of the light back along the waveguide layer 36. The reflected light is transferred by the extensions 38a and 40a back into the active layer 38. The semiconductor injection laser diode includes another reflector at its other end, which together with the Bragg reflector, forms an optical cavity for generating coherent light within the laser diode. The coherent light will be emitted from one of the surfaces of the device.

The following is an example of one specific construction of the semiconductor injection laser 24:

EXAMPLE II

A semiconductor injection laser 24 is formed of a substrate 34 of N type conductivity InP. The grooves 32 in the surface 30 of the substrate 34 are about 0.05 μm in depth and spaced apart about 0.4 μm. A waveguide layer 36 of N type conductivity InGaAsP having a refractive index of 3.44 is on the substrate surface 30. The waveguide layer 36 is of a thickness of between 0.3 and 0.4 μm. An active layer 38 of InGaAsP having an index of refraction of 3.47, when lattice matched at a wavelength of 1.35 μm, is on the waveguide layer 36. The active layer 38 is of a thickness of between 0.1 and 0.2 μm. The capping layer 40 is of P type conductivity InP. The confinement stripe 46 is a layer of aluminum oxide of 0.5 μm in thickness and 5.5 μm in width. This provides an injection laser which operates at a wavelength of 1.35 μm.

Figure 5:
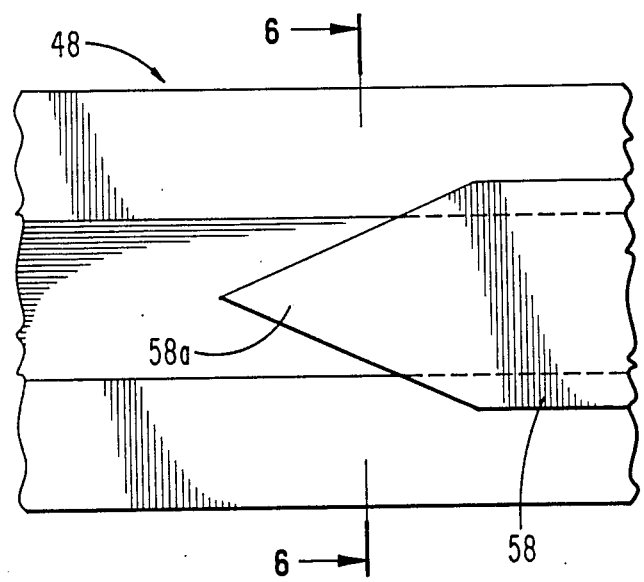
FIG. 5 is a top plan view of another form of the waveguide of the present invention.
Figure 6:
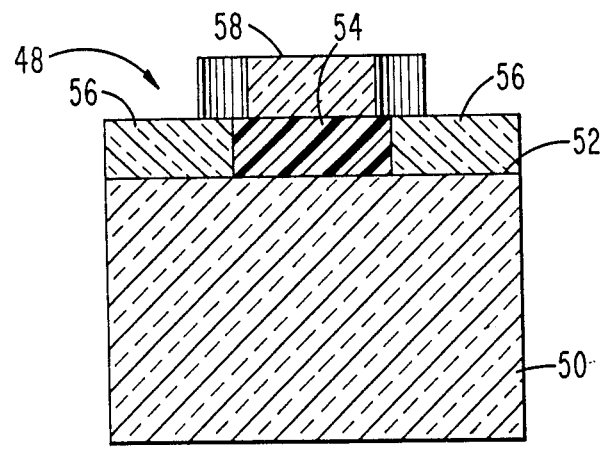
FIG. 6 is a sectional view taken along line 6—6 of FIG. 5.

Referring to FIGS. 5 and 6 there is shown a waveguide, generally designated as 48, which will transform a beam having a rectangular cross-section, such as might be coupled from the laser diode, to a symmetric beam. Contrary to the waveguide 10 shown in FIGS. 1 and 2, which decreases the size of the beam, the waveguide 48 increases the effective beam size in the transverse direction. The waveguide 48 includes a substrate 50 of a material having a refractive index $n_S$. On a surface 52 of the substrate 50 is a waveguide layer 54 of a width less than the width of the substrate 50 and of a material having an index of refraction $n_w$ which is greater than $n_S$. On the substrate surface 52, along each side of the waveguide layer 54, is a first confinement layer 56 of the same thickness as the waveguide layer 54 and of a material having an index of refraction $n_{c1}$ which is less than $n_w$. On a portion of the waveguide layer 54 is a second confinement layer 58 of a width greater than the width of the waveguide layer 54 so that it overlaps onto a portion of the first confinement layer 56 on each side of the waveguide layer 54. The second confinement layer 58 is of a material having an index of refraction $n_{c2}$ which is less than $n_w$. The second confinement layer 58 has an extension 58a which tapers in width to a point directly over the waveguide layer 54 and serves as the transition region.

In the operation of the waveguide 48, a light beam entering the uncovered end of the waveguide layer 54 will be confined by the first confinement layer 56 so that the light beam has a lateral dimension corresponding to that of the waveguide layer 54. When the beam reaches the tapered extension 58a of the second confinement layer 58, its lateral dimension will be expanded until it corresponds to the lateral dimension of the second confinement layer 58. Thus, the lateral dimension of the beam will be increased. The following is an example of a specific construction of a waveguide 48:

EXAMPLE III

A waveguide 48 includes a substrate 50 of glass having an index of refraction of 1.5. On the surface 52 of the substrate 50 is a waveguide layer 54 of an epoxy having an index of refraction of 1.566, a width of 2.8 μm and a thickness of 0.92 μm. On each side of the waveguide layer 54 is a first confinement layer 56 of glass having an index of refraction of 1.5 and a thickness of 0.92 μm. On a portion of the waveguide layer 54 is a second confinement layer 58 of glass having an index of refraction of 1.5534 and a width of about 3.4 μm. This provides a waveguide in which the uncovered portion of the waveguide layer 54 can receive a light beam of a mode having a transverse dimension of 1.3 μm and a lateral dimension of 3.9 μm. In the portion of the waveguide layer 54 under the second confinement layer 58 the light beam will have a mode in which both the transverse and lateral dimensions will be 3.9 μm.

The waveguide 48 can be made by coating the substrate surface 52 with material of the waveguide layer 54 and, using standard photolithographic techniques, an etching defining the layer to the desired width of the waveguide layer 54. While protecting the waveguide layer 54, the material of the first confinement layer 56 can then be coated on each side of the waveguide layer 54. A layer of the material of the second confinement layer 58 is then coated over the waveguide layer 54 and first confinement layer 56 and, using standard photolithographic techniques and etching, is defined to the size and shape of the second confinement layer 58 and its extension 58a. Thus, the waveguide 48 can be made by standard coating and photolithographic definition steps.

Figure 7:
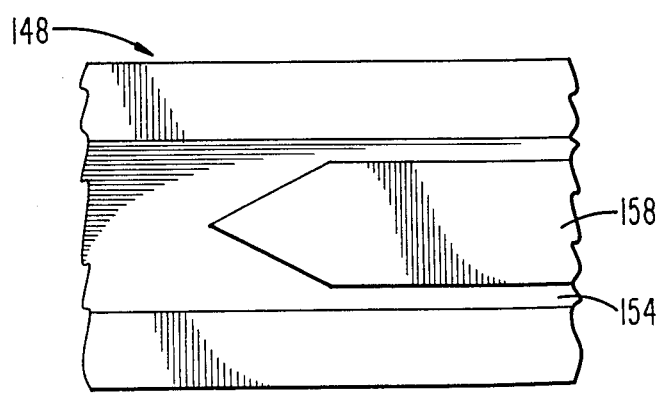
FIG. 7 is a top plan view of still another form of the waveguide of the present invention.

The waveguide 148 shown in FIG. 7 is similar to the waveguide 48 shown in FIGS. 5 and 6 except that the second confinement layer 158 is narrower than the width of the waveguide layer 154. In the waveguide 148 the change in dimensions of the light beam is obtained by controlling the index of refraction of the second confinement layer 158. For example, if the waveguide 148 is made of a substrate, waveguide layer and first confinement layer of the same materials and dimensions as the waveguide 48 described above, but with a second confinement layer 158 of a glass having an index of refraction of 1.56 and a width of 2.7 μm, the beam which has a transverse dimension of 1.3 μm and a lateral dimension of 3.9 μm will be converted to a beam having both transverse and lateral dimensions of 3.9 μm.

Thus, there is provided by the present invention a waveguide which can transform a beam of light having a particular cross-sectional geometry to a beam having a different geometry. In each form of the waveguide of the present invention there is a transition region which tapers in width but is of uniform thickness whicn results in the transformation of the geometry of the beam. The waveguide of the present invention is made up of layers of different material which can be deposited by well-known techniques and which can be confined to the desired size and shape by standard photolithgraphic techniques and etching. This permits for ease of manufacture of the waveguide.

I claim:
1. A waveguide comprising
    a substrate having a major surface,
    a waveguide layer of a material having a refractive index $n_w$ overlying said major surface,
    at least one confinement layer on said waveguide layer having a primary region and a transition region, said primary region being of a material having a refractive index $n_{c1}$, and
    said transition region extends from said confinement layer and said transition region tapers in width in the lateral direction, from the width of the primary region of the confinement layer toward a point located at an end of said confinement layer.
2. A waveguide in accordance with claim 1 wherein $n_{c1}$ is less than $n_w$.
3. A waveguide in accordance with claim 1 including a pair of aligned confinement layers on said waveguide layer, said confinement layers being of the same thickness and of different widths, and the transition region including an extension of one confinement layer which tapers from the width of the one confinement layer to a point and the other confinement layer extends along and contacts both sides of the extension of the one confinement layer.
4. A waveguide in accordance with claim 3 in which each of the confinement layers is of a material having an index of refraction less than $n_w$ and different from that of the other confinement layer.
5. A waveguide in accordance with claim 3 wherein the one confinement layer is narrower than the other confinement layer and the wider confinement layer includes an extension of which extends along and contacts both sides of the extension of the one confinement layer and tapers in decreasing width from the width of the other confinement layer.
6. A waveguide in accordance with claim 4 in which the one confinement layer is wider than the other confinement layer.

7. A waveguide in accordance with claim 6 in which the one confinement layer is the active layer of the laser diode which is adapted to generate the light therein.

8. A waveguide in accordance with claim 1 wherein the one confinement layer is on the waveguide layer and another confinement layer is along each side of the waveguide layer.

9. A waveguide in accordance with claim 8 wherein each of said confinement layers is of a material having an index of refraction less than that of the waveguide layer.

10. A waveguide in accordance with claim 9 in which the one confinement layer is wider than the waveguide layer and overlaps a portion of the other confinement layer on each side of the waveguide layer.

11. A waveguide in accordance with claim 10 in which the one confinement layer is narrower than the waveguide layer.

* * * * *